(12) United States Patent
Abel

(10) Patent No.: US 9,691,394 B2
(45) Date of Patent: Jun. 27, 2017

(54) SYSTEM AND METHOD FOR INTERACTIVE VOICE RESPONSE UNIT TABLE-BASED PROGRAMMING

(71) Applicant: Hartford Fire Insurance Company, Hartford, CT (US)

(72) Inventor: David S. Abel, Allentown, PA (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 15/237,991

(22) Filed: Aug. 16, 2016

(65) Prior Publication Data

US 2016/0358611 A1   Dec. 8, 2016

Related U.S. Application Data

(63) Continuation of application No. 14/677,574, filed on Apr. 2, 2015, now Pat. No. 9,432,508, which is a continuation of application No. 13/949,887, filed on Jul. 24, 2013, now Pat. No. 9,008,285.

(51) Int. Cl.
| | |
|---|---|
| *H04M 1/64* | (2006.01) |
| *G10L 17/22* | (2013.01) |
| *H04M 3/493* | (2006.01) |
| *G06F 3/0482* | (2013.01) |
| *H04M 3/42* | (2006.01) |

(52) U.S. Cl.
CPC ............ *G10L 17/22* (2013.01); *G06F 3/0482* (2013.01); *H04M 3/42034* (2013.01); *H04M 3/493* (2013.01); *H04M 3/4936* (2013.01)

(58) Field of Classification Search
CPC ... G10L 17/22; G06F 3/0482; H04M 3/42034
See application file for complete search history.

(56) References Cited

U.S. PATENT DOCUMENTS

| | | | | |
|---|---|---|---|---|
| 5,892,814 A | * | 4/1999 | Brisebois | H04M 1/663 |
| | | | | 379/76 |
| 7,297,111 B2 | * | 11/2007 | Iliff | G06F 19/324 |
| | | | | 128/920 |
| 2002/0057678 A1 | * | 5/2002 | Jiang | H04L 12/5895 |
| | | | | 370/353 |

(Continued)

*Primary Examiner* — Simon King
(74) *Attorney, Agent, or Firm* — Ference & Associates LLC

(57) ABSTRACT

An embodiment provides a modular framework for managing multiple router applications in an interactive voice response (IVR) system. In an embodiment, a single table-driven framework approach is taken in which multiple IVR router applications, including menu/response type call routing applications and/or frequently asked question (FAQ)/response applications, may be managed in a more streamlined fashion. In an embodiment, a menu is presented to the caller. The menu is part of the router application which references information stored in a database, e.g., voice files and grammars, defined in a format, e.g., in table format. An embodiment analyzes the caller's responses against the menu's information to determine the appropriate actions to take and the appropriate data to retrieve. An embodiment also provides a centralized authentication process that may be used for all self-service router applications that require or somehow make use of authentication.

20 Claims, 7 Drawing Sheets

(56) References Cited

U.S. PATENT DOCUMENTS

| | | | |
|---|---|---|---|
| 2002/0193995 A1* | 12/2002 | Case | G10L 13/06 704/260 |
| 2003/0220866 A1* | 11/2003 | Pisaris-Henderson | G06Q 30/02 705/37 |
| 2006/0093101 A1* | 5/2006 | Patel | H04M 3/12 379/88.16 |
| 2009/0177300 A1* | 7/2009 | Lee | G11B 20/10527 700/94 |
| 2011/0028127 A1* | 2/2011 | Wood | H04M 3/53366 455/412.1 |

\* cited by examiner

| Column Name | Description |
|---|---|
| Menu_ID | Menu ID |
| Menu_Choice | Selection is determined by key pressed, i.e. '1', '2', etc. Additional options are: <br> REP - Action for caller saying "Representative" <br> BYE - Action for caller saying "Goodbye" <br> RPT - Action for caller saying "Repeat" <br> NIP - action for no input |
| Action_Type | Action to be taken for this selected option: <br> C - Transfer (e.g., to another application). <br> H - Hang Up <br> M - Play another menu <br> U - Transfer (e.g., to an extension (CSR) |
| Vox_File_Name | Vox file name to be played (e.g., before executing the indicated action type). |
| Description | Description of menu |
| Destination | (Menu/Number/URL) |
| Success_Indicator | Indicates a call hitting this option is considered successful |
| KOUT_FLAG | Indicator to send back to the system, when transferring a call to direct routing. |

FIG. 5

| Column Name | Description |
|---|---|
| Prompt_ID | ID of the Prompt to be given |
| Vox_File_Name | Prompt.vox file name |
| Description | Description Prompt |
| Prompt_Type | Type of data collection for this prompt: "SP" (Speech). "MU" (Menu) |
| Maxlength | Record Time [for Speech collection; 5, 10, 20 or 30 seconds available] |
| Menu_ID | Menu ID for menu prompts |
| Playback_Vox | Vox file name for playback (abbreviated prompts) |
| Repeat_Vox_File | Vox file for repeat (noinput, nomatch). If blank, default to Vox_File_Name. |

FIG. 6

| Column Name | Description |
|---|---|
| Application_ID | Integer ID of the Application (Voice Form) |
| Prompt_Sequence | Prompt Sequence |
| Prompt_ID | ID of the Prompt to be given |
| Description | Description Prompt |
| Next_Prompt | Sequence of Next Prompt to play |

FIG. 7

SYSTEM AND METHOD FOR INTERACTIVE VOICE RESPONSE UNIT TABLE-BASED PROGRAMMING

CROSS REFERENCE TO RELATED APPLICATIONS

This application is a continuation application of U.S. patent application Ser. Nos. 13/949,887 and 14/677,574, each entitled SYSTEM AND METHOD FOR INTERACTIVE VOICE RESPONSE UNIT TABLE-BASED PROGRAMMING, filed on Jul. 24, 2013, and Apr. 2, 2015, respectively, the contents of which are each incorporated by reference entirely herein.

BACKGROUND

Interactive voice response (IVR) systems involve a technology that permits a programmed machine (e.g., computer system) to provide interactive voice responses to callers. Such IVR systems commonly take as input either voice input or dual-tone multi-frequency signaling (DTMF) input.

IVR systems aim to enhance customer service, e.g., via allowing callers to interface with the IVR system for common needs (e.g., self service applications, frequently asked question (FAQ) flows, etc.). IVR systems commonly are programmed extensively to appropriately respond to caller input with prerecorded audio files and/or transfers to further direct users and allow them to proceed through the system, answer caller inquiries, and/or provide self service applications. IVR systems are used to control a variety of interactive applications. IVR systems are deployed in many contexts and are finding expanded use as additional devices come on line. For example, IVR systems may be used in automobiles equipped with phone systems.

A typical IVR system includes a menu driven program that is customized for a given application scenario. As such, the custom program includes the logic (e.g., how to respond to caller input) as well as the actual responses to provide to the user. This links the callers input to the IVR system's response such that a given input from a caller results in the IVR system program responding based on the system logic.

BRIEF SUMMARY

An embodiment provides a modular framework for managing multiple router applications in an interactive voice response (IVR) system. In an embodiment, a single table-driven framework approach is taken in which multiple IVR router applications, including menu/response type call routing applications and/or frequently asked question (FAQ)/response applications, may be managed in a more streamlined fashion. In an embodiment, a menu is presented to the caller. The menu is part of the router application which references information stored in a database, e.g., voice files and grammars, defined in a format, e.g., in table format. An embodiment analyzes the caller's responses against the menu's information to determine the appropriate actions to take and the appropriate data to retrieve. An embodiment also provides a centralized authentication process that may be used for all self-service router applications that require or somehow make use of authentication.

As will be appreciated from a review of the further description provided herein, the various embodiments allow new router applications (including FAQ flow applications) to be deployed with simple database file and/or menu/table changes. Thus, embodiments permit a system administrator to avoid a full-scale re-development of a router application for each change.

In summary, an embodiment includes a computerized interactive voice response system having a modular router application that processes audio files for interactive voice response applications. The system includes a display that displays a plurality of components of a modular router application, with the display comprising the plurality of components of the modular router application displayed in a structured format, including a listing of a plurality of menu choices, at least one sequence of audio files, and a plurality of pointers to a plurality of stored audio files. In the system, an input device receives an input that changes at least one pointer of the plurality of pointers to a changed pointer, where the changed pointer indicates a different audio file. In the system, a processor modifies the modular router application to form a modified router application including the changed pointer, and a database stores the modified router application comprising the changed pointer. The modified router application plays a different audio file according to the changed pointer.

In an embodiment, a computerized method for programming a modular router application that processes audio files for interactive voice response applications includes displaying, using a display device, a plurality of components of a modular router application. The displaying includes displaying the plurality of components of the modular router application in a structured format comprising a listing of a plurality of menu choices, at least one sequence of audio files, and a plurality of pointers to a plurality of stored audio files. In an embodiment, an input device receives an input that changes at least one pointer of the plurality of pointers to a changed pointer, where the changed pointer indicates a different audio file. A processor modifies the modular router application to form a modified router application including the changed pointer and stores, in a database, the modified router application comprising the changed pointer. The modified router application plays a different audio file according to the changed pointer.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 5 illustrates an example representation of router/application functionality.

FIG. 6 illustrates another example representation of menu contents.

FIG. 7 illustrates another example of router/application functionality.

DETAILED DESCRIPTION

Figure 1:
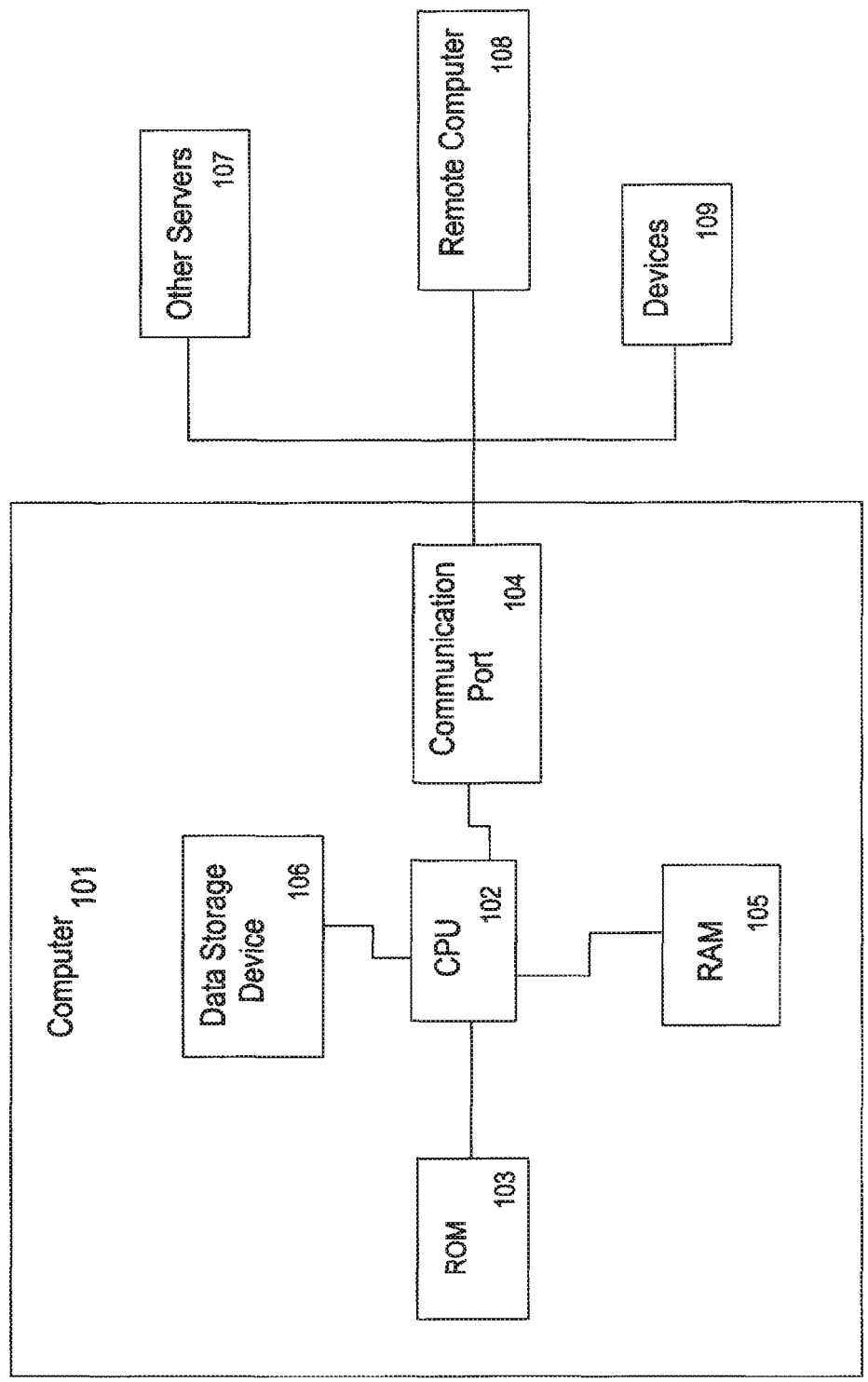
FIG. 1 illustrates a block diagram of an example computing architecture suitable for implementing the embodiments described herein.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, managing IVR systems is a time consuming process. Change implementation in an IVR system conventionally has required reprogramming the menu/application logic as well as coding in the new response(s). For example, to offer a Spanish language version of a menu, an IVR system router application would conventionally be re-formed to include a menu option announcing the additional underlying application functionality (i.e., Spanish language is an option). Additionally, coding in the additional responses themselves (i.e., the Spanish language response versions) was required to completely overhaul the IVR router application. Thus, to augment a single IVR system router application with a Spanish language capability required re-programming the single IVR system router application entirely, whereas augmenting a plurality of IVR system router applications with Spanish language capabilities required re-programming each IVR system router application. Much the same applied for FAQ flows, i.e., the entire flow would be re-worked in order to implement a change, with each flow application needing a re-working if a change was to be implemented.

In contrast, an embodiment provides a modular framework for managing multiple router applications in an IVR system. It is noted that "application(s)", "router(s)", "router application(s)" and like variations and combinations refer to an IVR system program menu and its logic. In an embodiment, a logic framework, including for example a menu formatted in a tabular layout, is provided that references stored files.

In an embodiment, a single table-driven framework approach is taken in which multiple IVR router applications, including menu/response type call routing applications and/or frequently asked question (FAQ)/response applications, may be managed in a more streamlined fashion. In an embodiment, a menu is presented to the caller. The menu is part of the router application which references information stored in a database, e.g., voice files and grammars, defined in a format, e.g., in table format. An embodiment analyzes the caller's responses against the menu's information to determine the appropriate actions to take and the appropriate data to retrieve. An embodiment also provides a centralized authentication process that may be used for all self-service router applications that require or somehow make use of authentication.

The various embodiments allow new router applications (including FAQ flow applications) to be deployed with just database file and/or menu/table changes. Thus, embodiments permit a system administrator to avoid a full-scale re-development of a router application for each change. Instead, a file referenced or a logical change (e.g., a table change) may be used to implement a new or different functionality.

FIG. 1 illustrates a block diagram of a computing architecture suitable for implementing an IVR system according to an embodiment. Computer 101 comprises at least one central processing unit (CPU)/processor 102, at least one read-only memory (ROM) 103, at least one communication port or hub 104, at least one random access memory (RAM) 105, and one or more databases or data storage devices 106. As illustrated, various elements are in communication with the CPU 102 to facilitate the operation of the computer 101. The computer 101 may be configured in many different ways. For example, computer 101 may be a conventional stand-alone computer or alternatively, the function of computer 101 may be distributed across multiple computing systems and architectures.

Computer 101 may be configured in a distributed architecture, wherein databases (e.g., data storage device 106) and processors (e.g., CPU 102) are housed in separate units or locations. Some such units may perform primary processing functions and contain at a minimum, a general controller or a CPU 102, a ROM 103, and a RAM 105. In such an embodiment, each of these units may be attached to a communications hub or port 104 that serves as a primary communication link with other servers 107, client or user computers 108 and other devices 109. The communications hub or port 104 may have processing capability itself, e.g., serving primarily as a communications router. A variety of communications protocols may be part of the system, including but not limited to: Ethernet, SAP, SAS™, ATP, BLUETOOTH™, GSM and TCP/IP or other suitable communication protocol for the type of data being communicated and/or the devices involved in the communication.

The CPU 102 may include one or more processors of various types. The CPU 102 is in communication with the communication port 104 through which the CPU 102 communicates with other devices such as other servers 107, remote computer 108, or devices 109. The communication port 104 may include multiple communication channels for simultaneous communication with, for example, other processors, servers or client terminals. Devices in communication with each other need not be continually transmitting data to/receiving data from each other. On the contrary, such devices need only transmit to each other as necessary, may actually refrain from exchanging data most of the time, and may require several steps to be performed to establish a communication link between the devices.

The CPU 102 may also be in communication with the data storage device 106. The data storage device 106 may comprise an appropriate combination of magnetic, optical and/or semiconductor memory, and may include, for example, RAM, ROM, flash drive, an optical disc such as a compact disc and/or a hard disk or drive. The CPU 102 and the data storage device 106 each may be, for example, located entirely within a single computer 101 or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 102 may be connected to the data storage device 106 via the communication port 104.

The data storage device 106 may store, for example, (i) a program (e.g., computer program code and/or a computer program product) adapted to direct the CPU 102 in accordance with the embodiments described throughout, and particularly in accordance with the processes described in detail with regard to the CPU 102; (ii) databases adapted to store information required by a program, e.g., various voice files and/or grammars, as referenced herein in connection with various embodiments.

The instructions or computer readable program code may be read into a main memory of the processor from a computer-readable medium other than the data storage device 106, such as from a ROM 103 or from a RAM 105. While execution of sequences of instructions in the program causes the CPU 102 to perform the process steps described herein, hard-wired circuitry may be used in place of, or in combination with, software instructions for implementation of the processes of the various example embodiments described throughout. Thus, embodiments are not limited to any specific combination of hardware and software.

Figure 2:
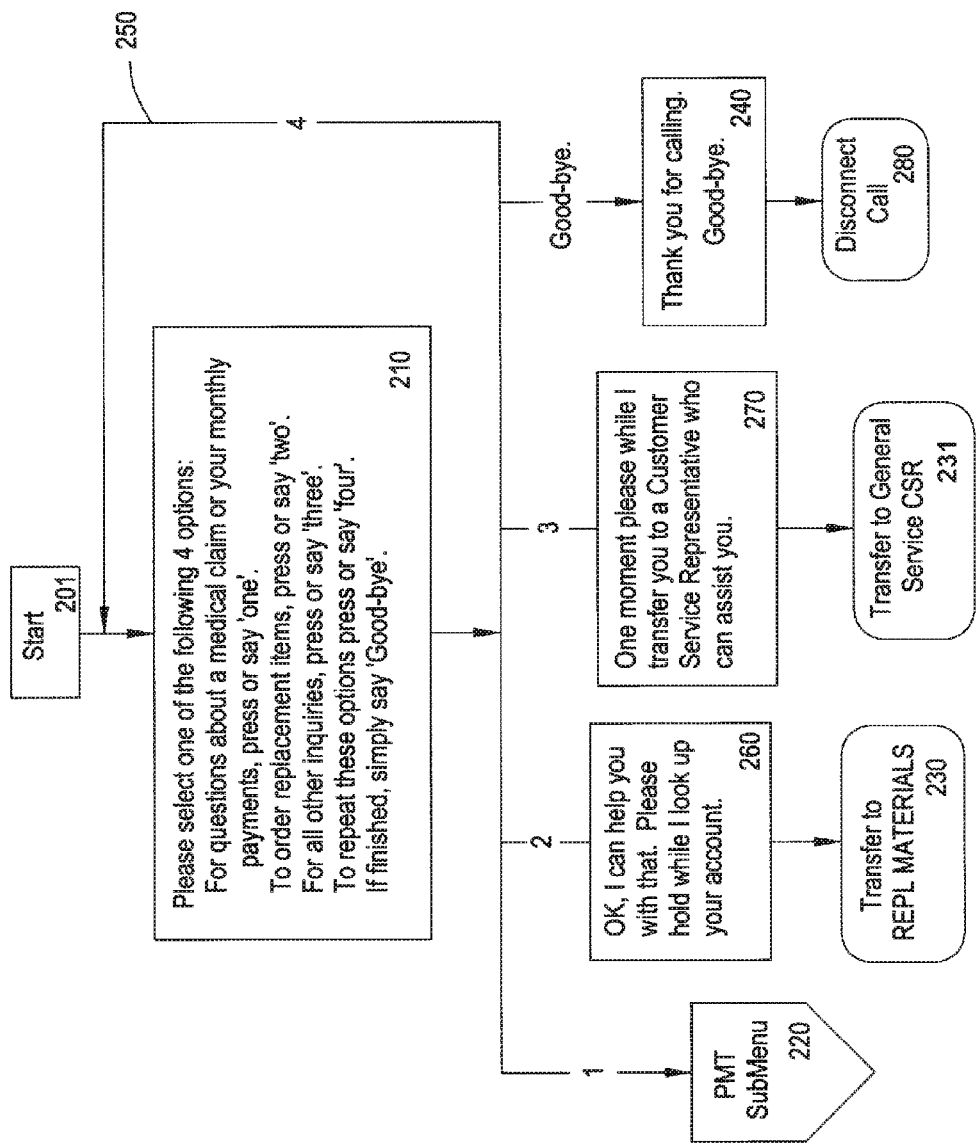
FIG. 2 illustrates a flow diagram of an example IVR router application.

Illustrated in FIG. 2 is a flow diagram of an example IVR router application. As illustrated, an incoming call 201 is first met with a menu of prompts at 210 that ask the user/caller to provide a response. In the example illustrated in FIG. 2 the menu of prompts is provided by a program asking the caller to select from four menu options, i.e., for questions, press or say "one", to order replacement items, press or say "two", for all other inquiries, press or say "three", and to repeat the menu options, press or say "four". The menu indicates a fifth option as well, i.e., if the caller is finished, simply say "good-bye".

Responsive to the menu prompts provided at 210, it is determined if the user has selected an appropriate response, e.g., inputting "one", "two", "three", "four" or "good-bye". Responsive to the user's input, one of five actions is undertaken. For example, if a user inputs "one", a submenu may be provided at 220 (here, a payment (PMT) sub-menu). If the user inputs "two", the user is provided with a transfer to another service at 230, here replacement (REPL) materials. If the user inputs "three", the user is transferred to a customer service representative (CSR). Notably, the router application may provide additional audio (e.g., 260 and 270) in response to input of "two" or "three", respectively, as illustrated in the example of FIG. 2.

If the user inputs "good-bye", the user is again provided with additional audio 240 prior to ending the call at 280. Similarly, if the user inputs "four", the top-level audio of the router application is played again at 250, optionally with modification or additional audio.

It can be noted that most router applications have similar characteristics to that illustrated in the flow of FIG. 2. For example, most router applications will provide a user with an initial prompt and provide either 1) a sub-menu; 2) attempt a transfer to another department or application; 3) attempt a transfer to a customer service representative; 4) repeat menu options; or 5) end the call.

An embodiment leverages this realization to provide a modular system wherein the menu options (and subsequent actions) are de-coupled from underlying data (e.g., audio files providing additional sub-menu choices, grammar files, transfer messages, additional information or resources contained in files, and the like). Thus, an IVR system administrator may utilize an embodiment to implement change(s) to the IVR system components (e.g., menu options, underlying actions, underlying audio data, etc.) individually without the need to provide a comprehensive re-write of a particular router application and its contents.

Figure 3:
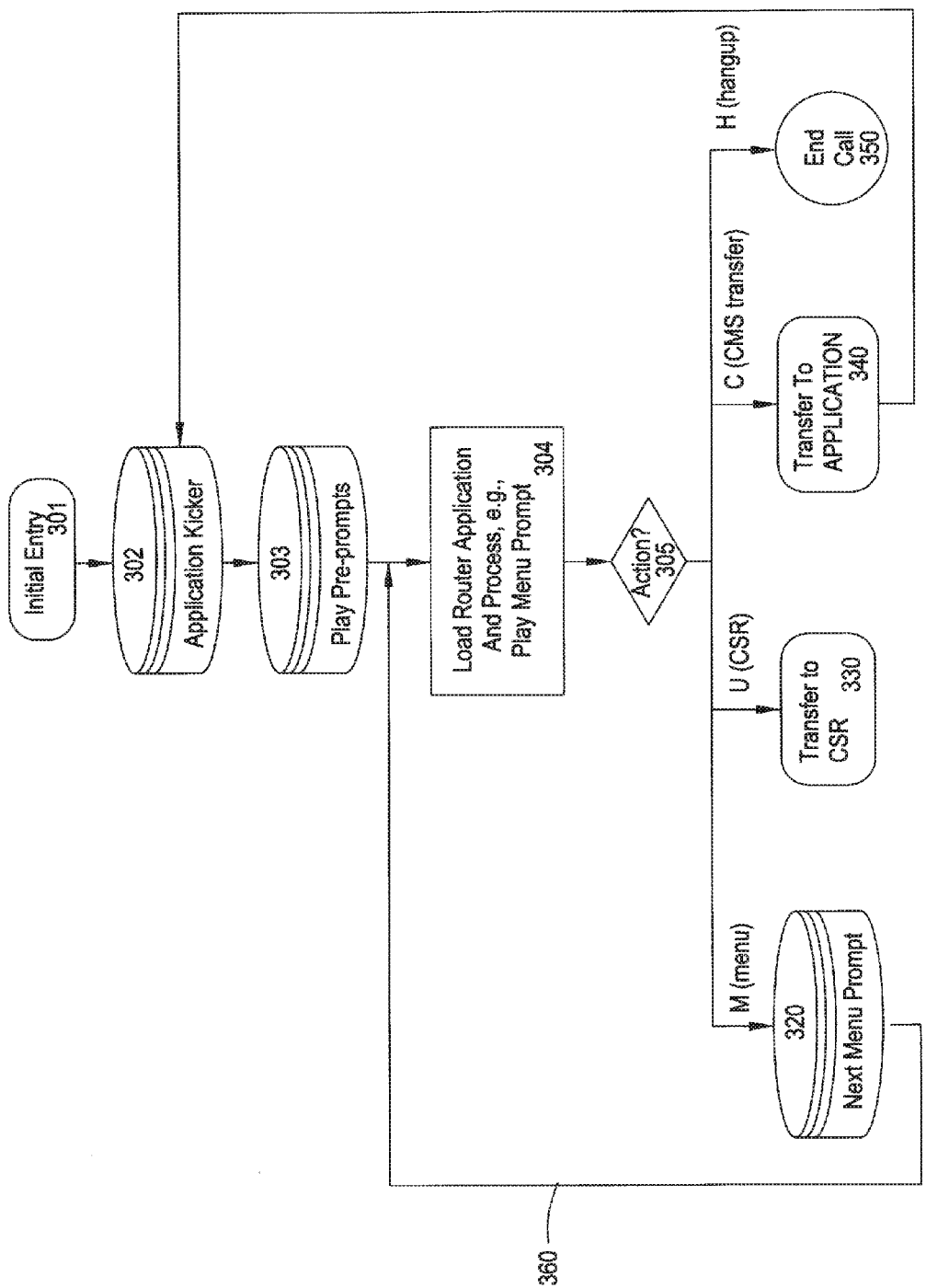
FIG. 3 illustrates an application router flow diagram according to an example embodiment.

For example, as illustrated in FIG. 3, at initial entry 301, a user contacts a call center computer 101 at communication port 104 via a voice call using a particular telephone number. An embodiment examines, e.g., using CPU 102, the initial entry at an application kicker 302. The application kicker 302 determines, e.g., using CPU 102, a characteristic of the initial entry (e.g., telephone number used to contact system) in order to determine an appropriate router application to present to the user. For example, CPU 102 may determine that a user has called a device (e.g., computer 101) using a particular phone number (e.g., an insurance policy help line versus an insurance policy payment line, distinguished by virtue of their differing phone numbers). Thus, an embodiment may utilize information contained in the initial entry 301 to the system to determine which of a plurality of router applications is appropriate.

At 303 an embodiment may optionally provide pre-prompts, e.g., utilize CPU 102 to output an audio message via communication port 104 to a user telephone device (e.g., device 109). A pre-prompt may be an audio message that is common to a plurality of router applications, such as "welcome to the system" or the like. Such optional pre-prompts may be provided at 303 in parallel with the determination by application kicker 302 of which router application to return, load and process/initiate. Additionally or alternatively, pre-prompts may be provided after an appropriate router application is identified, retrieved and loaded at 304.

An embodiment may also provide for a preliminary automatic number identification (ANI) lookup such that a caller may be identified by the telephone number used to dial into the system, e.g., performing an ANI lookup at the beginning of the router application to determine if there is an ANI match. Thus, a caller's information (e.g., name, address, account information and the like) may be retrieved and for later utilization (e.g., pre-populated into a customer service interface). Such information may find use in authentication processes, e.g., such as performed when a caller is transferred to a CSR (e.g., a CSR may utilize such information to authenticate a caller when a caller is transferred to a CSR from a router application).

The router application loaded at 304, for example via CPU 102 retrieving it from a memory device such as 103, 105 and/or 106, may initiate or play a menu prompt. The menu prompt played at 304 may be an application specific menu prompt, e.g., announcing the type of the application to which the user has connected and/or choices therein. Thus, the menu prompt provided at 304 may include playing of an audio file specific to the router application, as for example indicated in a menu of the router application.

A user may interact with the IVR system responsive to one or more played audio files. The router application loaded at 304 will have indications (e.g., via a table listing) of audio files to be played, such as menu options for selection by a user, grammars files to retrieve and utilize to process user responses, linkages to other router applications, etc. In an example embodiment, these indications may be generic indications that permit flexibly interchanging audio files and the like without changing the indications. For example, a router application may include an initial file name that links a particular audio file with the router application indication as the initial audio file. Thus, the initial audio file itself may be replaced with a new initial file using the same name and the router application's indication thereof need not be changed in order to retrieve the new initial audio file. Thus, when the new initial audio file is loaded into a database in place of the prior initial audio file, the router application will retrieve the new initial audio file. Additionally or in the alternative, the router application indication may be changed to indicate a new or different audio file (e.g., another one resident in a database), again allowing an IVR system administrator to change the information retrieved, e.g., audio files played, for the router application in a flexible manner.

Responsive to user interaction (or lack thereof) with the system, an embodiment determines an action at 305. This action is based on responsiveness of the user (e.g., menu selection, silence, input not understood, etc.). The actions, similar to FIG. 2, may include playing a next menu prompt (e.g., retrieval and playing of another or subsequent audio file) at 320, transferring the voice call, e.g., to a CSR at 330 or to another router application or self service application at 340, or terminating the call at 350. As another example, a bypass action may be performed, where a menu or sub-component thereof is skipped and a later menu or menu component is executed as part of a pre-determined process, e.g., as when a user opts-out of participating in a survey as part of the voice call. If the user is responsive or no response can be determined, the router application may cycle back to the router application at 360 to provide repeated or further prompts and determining of an action. Additionally, no input or no response may be treated as a valid response, e.g., no response to an audible prompt of "For English please remain on the line."

Figure 4:
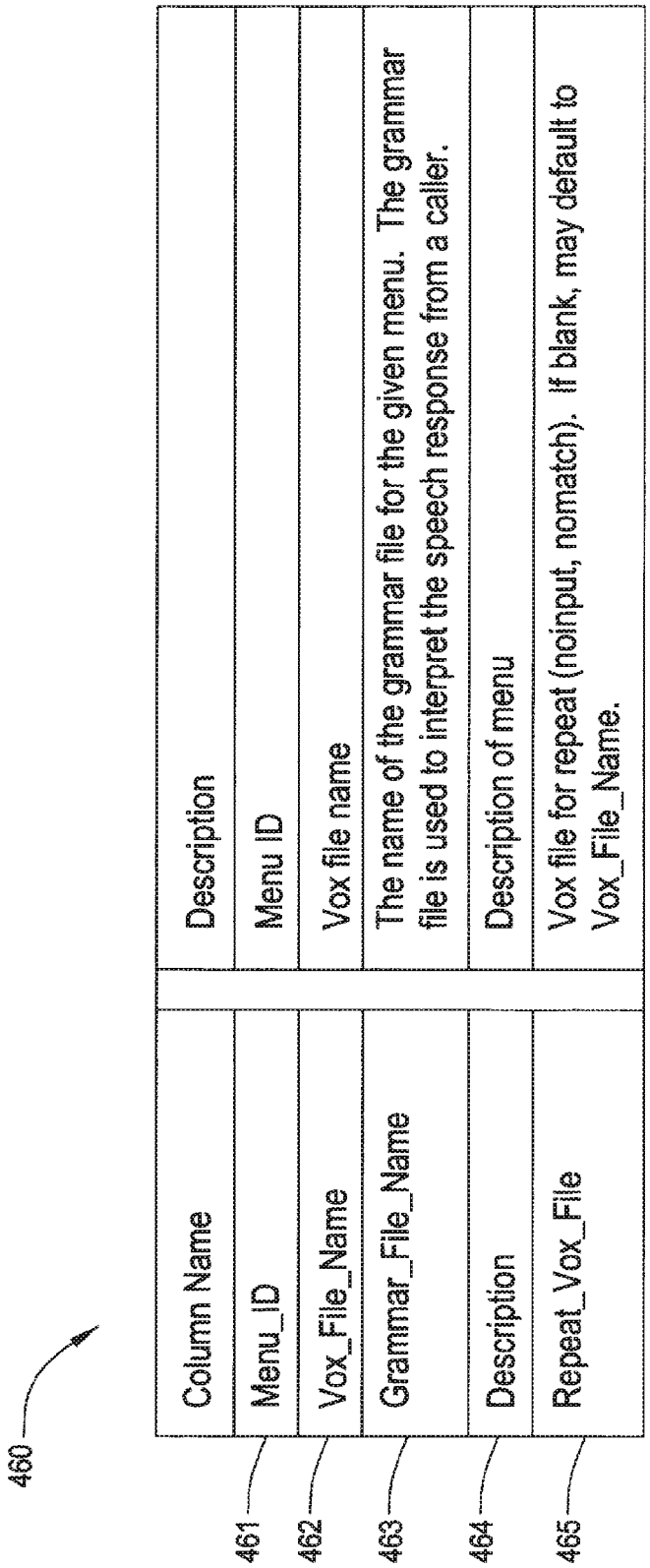
FIG. 4 illustrates an example representation of menu contents.

Illustrated in FIG. 4 is an example representation of menu contents, e.g., as seen by an IVR system administrator. The menu contents 460 provide information on how to play a given menu, e.g., the name of the file to play, any special grammar file to use, any special repeat file to play, etc. The menu contents 460 of a router application are provided in a convenient format, here illustrated as a table format. In the table is listed a Menu ID 461 and description thereof, thus allowing the IVR system administrator to know which menu/router application is represented, including a short description (which may be entered, e.g., via text entry).

Also included at 462 is an audio file name field and description of the audio file. Here, the Vox_File_Name indicates the audio file to which the router application indicates or points to. This is the audio file that will be retrieved, e.g., via CPU 102, responsive to loading and playing of the router application at 304. The audio file may include a first audio file such as a pre-prompt or a menu prompt offering menu selection options to a user, e.g., offering selections 1-4 or call disconnect, as outlined in FIG. 2.

The table 460 may also include a description of the menu 464 and an indication for retrieving additional data, e.g., an audio file Repeat_Vox_File 465 for replay of the menu prompts responsive to user selection, e.g., input of "four" in FIG. 2. The table 460 may include at 463 an indication for retrieving one or more grammar files, e.g., Grammar_File-_Name is a name for a grammar file to be retrieved by the router application loaded at 304. A grammar file allows the router application to implement functionality such as speech recognition (e.g., for processing voice inputs of the user). As can be appreciated from the table representation 460 of menu contents in FIG. 4, the various contents in the fields, e.g., field 461-465 may be changed such that the contents indicated by a router application change. For example, by placing a new or different audio file indication in field 462, a new or different audio file will be retrieved, e.g., by CPU 102 at step 304 of FIG. 3. The same applies for other components/contents of the router application, e.g., grammar files indicated at 463.

In order to determine what the router application does, e.g., responsive to a user input (or lack thereof), FIG. 5 illustrates an example representation of router application functionality provided by an embodiment. In FIG. 5, a table representation 560 is provided that includes the actions or functionality of the router application. The table representation 560 provides information needed to process the selection(s) made on the menu, what action(s) to take, e.g., where to transfer the call, any special messages to play, whether the call is considered successful, etc. The representation 560 includes a menu identification field 561 and description thereof such that an IVR system administrator may identify the particular router application using the representation 560. The representation 560 may include a menu choice field 562 indicating the menu choice file (menu options or selections file) currently chosen for the router application in question. The representation includes in field 562 a description of the functionality (e.g., the options allowing for user input(s)). For example, the field 562 includes an indication of that the router application permits the user to provide input corresponding inputting a "1" response (e.g., in this router application, a user may input the number "one", etc.) and so on.

In the Action_type field 563 the action characteristics or types are described for this router application. Thus, in field 563 in the example of FIG. 5, actions such as "jump to another application", "hang up", "play another menu" and the like are listed because these are functions supported by the router application in response to various user inputs. The field 563 therefore corresponds to a field indicative of the functionality or action that will be executed, e.g., via CPU 102, responsive to input (or lack thereof) by a user.

A field 564 indicates an audio file, i.e., Vox_File_Name, indicating the audio file that will be played, e.g., prior to or after executing an action type. Like menu representation 460, representation 560 may include a description field 565 that describes the particular menu (e.g., payment menu, payment FAQ flow, etc.). A destination field 566 indicates to the IVR system administrator the linkage between this and another router application or destination, e.g., to which the caller may be sent. This provides the IVR system administrator with a sense of how the router application's actions are related to other router applications or components of a system.

At times an IVR system administrator may wish to track certain system parameters. Therefore, information fields may be included to facilitate such analysis. For example, a field 567 references a success indicator, which may be retrieved as a metric utilized to track if the particular router application is meeting user needs based on user responses. For example, a success may be counted as a user navigating to a certain point in the menu (e.g., an end point in the menu when a final audio file is played) or a user provides explicit feedback (e.g., router application was helpful), etc. A capture selection feature also may be employed in this regard to measure if an option is selected, e.g., a survey option has been selected by a user, and/or how many times an option is selected. This allows an IVR system administrator to analyze which router applications and/or components thereof may need to be modified or improved. A kick-out flag (KOUT) may be included for indicating a call may be sent back to a universal response system (URS) for direct routing as a responsive action to user input (or lack thereof).

An embodiment may include as an action type, e.g., indicated in field 563, a centralized authentication process that may be used for all self-service router applications that require or somehow make use of authentication. Thus, an action type may include authenticating, e.g., via a centralized authentication process, a user responsive to input to an application router. This may be accomplished for example via transferring a caller to another router application (e.g., an authentication application) from a certain menu.

Embodiments provide that various components of router applications may be managed in such a modular format. For example, in FIG. 6 is illustrated an example representation of a table formatted interface 660 in which a router application, e.g., an after hours or high volume call automated call menu and components thereof are illustrated. The table 660 therefore may provide information on how to play a given router application, e.g., the name of the file to play, any special repeat file to play, the type of data to collect, how long to record and even an abbreviated file to play during playback.

In a field 661 Prompt_ID an automated prompt (e.g., high call volume prompt) is identified and a corresponding portion of the field "ID of the Prompt to be given" is provided such that an IVR system administrator may enter identifying information for the prompt. Again, an audio file, filed 662 "Vox_File_Name" indicates the audio file that will be retrieved for the prompt. The prompt's file name (e.g., .vox file) may be input so as to provide for identification and retrieval/processing/playback during the router application. A description field 663 provides a data entry portion in which a description prompt may be entered. A prompt type field 664 is provided and indicates, e.g., the type of data collection for the prompt, for example "SP" (Speech), "MU" (Menu) or the like. A length field 665 (in FIG. 6, "Max-length") indicates a record time, e.g., for speech collection, such as 5, 10, 20 or 30 seconds of recording time available. A menu identification field 666, "Menu_Id" in FIG. 6, indicates identification for the menu. A playback field 667, "Playback_Vox", indicates a location of the audio file (e.g., .vox file) name for abbreviated playback, e.g., by a CSR reviewing user responses to an after hours or high volume call router application. Again, a repeat/modified audio file field 668, "Repeat_Vox_File" indicates an audio file for repeat (e.g., in a no input, no match or like situation). If field 668 is left blank, a default to the original audio file may be made.

As can be appreciated from the foregoing, an IVR system administrator may utilize the various embodiments and the organized (e.g., tabular) framework provided to implement a modular system in which various components (e.g., audio files, grammars, etc.) may be changed or modified without requiring a whole-sale rewrite of a router application. This permits increased flexibility in an IVR system and promotes frequent change to closely match rapidly evolving consumer demands without fear of impacting disparate parts of the system.

For example, referring to FIG. 7, an example of defining the components (e.g., voice prompts) to be included in a router application and the ordering thereof is illustrated. In the table 760 a variety of editable fields are included. The table 760 provides information needed to build or compose the router application, e.g., which questions to play, what sequence to play them in, etc.

Thus, an administrator of an IVR system may modify one or more of 761, 762, 763, 764, and 765, including choosing new contents (e.g., audio files) or re-ordering thereof (e.g., changing the ordering of voice prompts) such that a modular implementation to routing applications is realized. Again, the table 760 provides indications of files, e.g., Prompt_Sequence, that are used in a router application and that may be changed. Thus, a system administrator may modify field 762, Prompt_Sequence, and thus modify the ordering of various voice prompts (and indicated audio files) presentation to a user without re-working the entire router application. As such, an IVR system administrator will be allowed to modify a router application or component thereof without the need to re-enter certain information (e.g., a referenced audio file will be utilized after a change but in a different order or in response to a different menu selection by a user). Thus, an IVR system administrator may simply re-order existing audio files, choose different grammars, etc.

It will be readily understood that certain embodiments may include a computer program product. The computer program product may include a storage medium. The term "storage medium" is defined herein as a non-signal medium. Such a storage medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of storage media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, etc.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A computerized interactive voice response system having a modular router application that processes audio files for interactive voice response applications, comprising:
a display that displays a plurality of components of a modular router application;
the display comprising the plurality of components of the modular router application displayed in a structured format comprising a listing of a plurality of menu choices, at least one sequence of audio files, and a plurality of pointers to a plurality of stored audio files;
an input device that receives an input that changes at least one pointer of the plurality of pointers to a changed pointer;
the changed pointer indicating a different audio file;

a processor that modifies the modular router application to form a modified router application including the changed pointer; and a database that stores the modified router application comprising the changed pointer, wherein the modified router application plays a different audio file according to the changed pointer.

2. The computerized interactive voice response system of claim 1, further comprising:

a communication port that receives data of an incoming voice call;

wherein the processor retrieves, from the database, the modified router application, loads, into an electronic memory of the system, the modified router application, and executes a portion or all of the modified router application.

3. The computerized interactive voice response system of claim 2, wherein the execution a portion or all of the modified router application comprises retrieving, from a memory of the system, the different audio file indicated by the changed pointer.

4. The computerized interactive voice response system of claim 3, wherein the different audio file indicated by the changed pointer comprises an audio file selected from the group consisting of a new audio file and an audio file previously pointed to by the modular router application.

5. The computerized interactive voice response system of claim 3, wherein the processor plays the different audio file to produce audible sound at a receiving device.

6. The computerized interactive voice response system of claim 1, wherein the input that changes at least one pointer of the plurality of pointers to a changed pointer adds at least one new audio file to use a previously used pointer.

7. The computerized interactive voice response system of claim 1, wherein a storage location of the new audio file is indicated by the previously used pointer without modification to the modular router application.

8. The computerized interactive voice response system of claim 1, wherein:

the input device receives an input that changes the at least one sequence of audio files to a new sequence of audio files; and the processor modifies the modular router application to form a modified router application including the new sequence of audio files and stores, in the database, the modified router application comprising the new sequence of audio files, wherein the modified router application plays audio files according to the new sequence of audio files.

9. The computerized interactive voice response system of claim 2, wherein the processor selects another router application based on caller responsiveness data.

10. The computerized interactive voice response system of claim 2, wherein the processor selects another router application based on caller identification.

11. A computerized method for programming a modular router application that processes audio files for interactive voice response applications, comprising:

displaying, using a display device, a plurality of components of a modular router application;

the displaying comprising displaying the plurality of components of the modular router application in a structured format comprising a listing of a plurality of menu choices, at least one sequence of audio files, and a plurality of pointers to a plurality of stored audio files;

receiving, using an input device, an input that changes at least one pointer of the plurality of pointers to a changed pointer;

the changed pointer indicating a different audio file;

modifying, using a processor, the modular router application to form a modified router application including the changed pointer; and storing, in a database, the modified router application comprising the changed pointer, wherein the modified router application plays a different audio file according to the changed pointer.

12. The method of claim 11, further comprising:

receiving, at a communication port of a device, data of an incoming voice call;

retrieving, from a database, the modified router application and loading, into an electronic memory of the device, the modified router application; and executing a portion or all of the modified router application.

13. The method of claim 12, wherein the executing a portion or all of the modified router application comprises retrieving, from a memory, the different audio file indicated by the changed pointer.

14. The method of claim 13, wherein the different audio file indicated by the changed pointer comprises an audio file selected from the group consisting of a new audio file and an audio file previously pointed to by the modular router application.

15. The method of claim 13, further comprising playing the different audio file to produce audible sound at a receiving device.

16. The method of claim 11, further comprising adding at least one new audio file to use a previously used pointer.

17. The method of claim 11, wherein a storage location of the new audio file is indicated by the previously used pointer without modification to the modular router application.

18. The method of claim 11, further comprising:

receiving, using the input device, an input that changes the at least one sequence of audio files to a new sequence of audio files;

modifying, using the processor, the modular router application to form a modified router application including the new sequence of audio files; and storing, in the database, the modified router application comprising the new sequence of audio files, wherein the modified router application plays audio files according to the new sequence of audio files.

19. The method of claim 12, further comprising selecting another router application based on caller responsiveness data.

20. The method of claim 12, further comprising selecting another router application based on caller identification.

* * * * *